US 12,224,848 B2

(12) United States Patent
Lin et al.

(10) Patent No.: US 12,224,848 B2
(45) Date of Patent: Feb. 11, 2025

(54) DATA PACKET PROCESSING METHOD AND APPARATUS

(71) Applicant: HUAWEI TECHNOLOGIES CO., LTD., Shenzhen (CN)

(72) Inventors: Meixin Lin, Hangzhou (CN); Xueqiang Yan, Shanghai (CN); Xian Meng, Hangzhou (CN); Yunfei Qiao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 910 days.

(21) Appl. No.: 17/502,353

(22) Filed: Oct. 15, 2021

(65) Prior Publication Data
US 2022/0209859 A1 Jun. 30, 2022

Related U.S. Application Data

(63) Continuation of application No. PCT/CN2020/084658, filed on Apr. 14, 2020.

(30) Foreign Application Priority Data

Apr. 18, 2019 (CN) .......................... 201910313969.7

(51) Int. Cl.
*H04B 7/185* (2006.01)
*H04W 8/26* (2009.01)
(Continued)

(52) U.S. Cl.
CPC .......... *H04B 7/18584* (2013.01); *H04W 8/26* (2013.01); *H04W 40/02* (2013.01); *H04W 40/24* (2013.01)

(58) Field of Classification Search
CPC .... H04B 7/18584; H04W 8/26; H04W 40/02; H04W 40/24
See application file for complete search history.

(56) References Cited

U.S. PATENT DOCUMENTS 6,519,243 B1 * 2/2003 Nonaka ................... H04L 61/35
370/338
8,660,526 B1 * 2/2014 Heiderscheit ..... H04M 1/72457
455/410
(Continued)

FOREIGN PATENT DOCUMENTS

CN 101354828 A 1/2009
CN 101262272 A 8/2011
(Continued)

OTHER PUBLICATIONS

3GPP TR 38.821 V0.4.0 (Mar. 2019), 3rd Generation Partnership Project; Technical Specification Group Radio Access Network; Solutions for NR to support non-terrestrial networks (NTN) (Release 16), 46 pages.
(Continued)

Primary Examiner — Dominic E Rego
(74) Attorney, Agent, or Firm — Rimon PC

(57) ABSTRACT

This application provides a data packet processing method and apparatus, applied to a satellite communications system. An earth surface, space, and network space are divided based on a satellite constellation and an ephemeris of a satellite, and an identifier is allocated to each ground area, each space area, and each network that are sub-divisions of the earth surface, space and network space, to establish a fixed mapping relationship between the EID, the SID, and the NID. In addition, each satellite maintains mapping relationship information recording the mapping relationship. Unless a satellite joins the constellation or one satellite leave service, the mapping relationship recorded in the mapping relationship information does not need to be updated. Based on the mapping relationship information, a satellite may route a data packet, thereby reducing a large amount of
(Continued)

signaling interaction caused by establishing and maintaining a routing table in the conventional manner.

19 Claims, 6 Drawing Sheets

(51) Int. Cl.
*H04W 40/02* (2009.01)
*H04W 40/24* (2009.01)

(56) References Cited

U.S. PATENT DOCUMENTS

| | | | | |
|---|---|---|---|---|
| 8,918,519 | B1* | 12/2014 | Bosch | H04L 67/55 709/227 |
| 9,221,553 | B1* | 12/2015 | Mitchell | B64G 1/1007 |
| 10,454,816 | B2* | 10/2019 | Carney | H04B 7/18517 |
| 2014/0279504 | A1* | 9/2014 | Cook | G06Q 20/3224 705/44 |
| 2014/0307619 | A1* | 10/2014 | Dolby | H04W 76/22 370/316 |
| 2014/0364146 | A1* | 12/2014 | Mirzaei | H04W 4/021 455/456.2 |
| 2015/0019320 | A1* | 1/2015 | Menendez | G06Q 30/0231 705/14.31 |
| 2015/0026181 | A1* | 1/2015 | Milton | G06F 16/2379 707/736 |
| 2017/0039242 | A1* | 2/2017 | Milton | H04W 4/02 |
| 2017/0105142 | A1* | 4/2017 | Hecht | H04B 7/185 |
| 2018/0295546 | A1* | 10/2018 | Crawford | H04L 67/10 |
| 2018/0309508 | A1* | 10/2018 | Regan | H04B 7/18584 |
| 2019/0149228 | A1* | 5/2019 | Ziskind | G01S 19/41 455/12.1 |
| 2022/0345209 | A1* | 10/2022 | Foxworthy | H04L 61/5007 |

FOREIGN PATENT DOCUMENTS

| | | |
|---|---|---|
| CN | 106454751 A | 2/2017 |
| CN | 106549703 A | 3/2017 |
| CN | 107231183 A | 10/2017 |
| CN | 107636985 A | 1/2018 |
| CN | 108881029 A | 11/2018 |
| CN | 109075853 A | 12/2018 |
| CN | 109150713 A | 1/2019 |
| EP | 1978650 A2 | 10/2008 |
| EP | 3026453 A1 | 6/2016 |
| WO | 2019036421 A1 | 2/2019 |

OTHER PUBLICATIONS

Xiao Yunlu et al: "Addressing Subnet Division Based on Geographical Information for Satellite-Ground Integrated Network", IEEE Access, vol. 6, Nov. 27, 2018 (Nov. 27, 2018), pp. 75824-75833,XP011701387,DOI: 10.1109/ACCESS.2018.2882594.

* cited by examiner

DATA PACKET PROCESSING METHOD AND APPARATUS

CROSS-REFERENCE TO RELATED APPLICATIONS

This application is a continuation of International Patent Application PCT/CN2020/084658, filed on Apr. 14, 2020, which claims priority to Chinese Patent Application No. 201910313969.7, filed on Apr. 18, 2019. The disclosures of the aforementioned applications are hereby incorporated by reference in their entireties.

TECHNICAL FIELD

This application relates to the field of wireless communications technologies, and in particular, to a data packet processing method and apparatus.

BACKGROUND

The 5th generation (5G) technology standard released by the3rd generation partnership project (3GPP) provides a space-ground integrated communications technology that seamlessly integrates satellite communications into a ground cellular network to implement seamless coverage of the entire earth by a wireless signal.

In an existing satellite communications system, a communications satellite forwards a wireless signal to implement wireless communications between either a satellite and a ground station or between satellites. The wireless signal may comprise information such as a telephone, a telegram, a fax, data, and a television signal. In a typical satellite communications system, a terminal device on the ground is connected to a satellite in space through a service link. In addition, the satellite communicates with a ground station through a feedback link. Usually, the satellite has two working modes, which are respectively a transparent mode and a regenerative mode. In the transparent mode, the satellite has no routing function. After a terminal device sends data to the satellite, the satellite is responsible for forwarding the wireless signal to the ground station, and then sends, by using a routing function of the ground station, the wireless signal to a destination satellite corresponding to a destination terminal device. Finally, the destination satellite forwards the wireless signal to the destination terminal device. Because of a round trip between the ground station and the satellite, a transmission delay is relatively large, and can be about 500 milliseconds or more. However, in the regenerative mode, a routing function based on the Internet Protocol (IP) is added to the satellite. In this way, simple exchanging or routing between satellites can be implemented, so that the wireless signal in the transparent mode can reach the destination satellite without passing through the ground station.

However, satellite communication differs from the ground station in that the satellites move rapidly. The period of time in which a satellite can serve a terminal device on the ground is about 10 minutes. Therefore, when a routing table forwarded based on the IP is established on the satellite, information about the routing table needs to be updated very frequently. Practice data indicates that an update period of the routing table is about 30 seconds to one minute. Understandably, establishing the routing table forwarded based on the IP causes the entire satellite communications system to bear a huge signaling transmission load.

SUMMARY

This application provides a data packet processing method and apparatus, applied to a satellite communications system, to reduce signaling overheads in a data forwarding process in satellite communications systems.

According to a first aspect, this application provides a data packet processing method. The method includes: A first satellite receives a data packet, where the data packet carries an Internet Protocol (IP) address of a destination device, and the IP address includes a network identifier (NID); the first satellite determines, based on the NID, mapping relationship information, an ephemeris, and an identifier of a destination satellite corresponding to the NID, where the mapping relationship information is used to record a mapping relationship between the NID, an earth surface identifier (EID), and a space identifier (SID); and the first satellite sends the data packet to the destination satellite.

Herein, the method of the first aspect is applicable to any satellite in a satellite communications system. To clearly describe the technical solution, one satellite of the satellite communications system is used as an example. For ease of description, that satellite is referred to as the first satellite.

In the technical solution of this application, an earth surface, space, and network space are divided based on a satellite constellation and a running track of a satellite. An identifier is allocated to each ground area, each space area, and each network obtained through division of the earth surface, space, and network space, to establish a fixed mapping relationship between the ground area identifier (EID), the space identifier (SID), and the network identifier (NID). In addition, each satellite maintains the mapping relationship information recording the mapping relationship between the NID, the EID, and the SID. Therefore, so long as no new satellite joins the satellite constellation and no satellite is removed, such as due to service expiration, then the mapping relationship information does not need to be updated. Optionally, the mapping relationship information may be updated in a unit of year.

Based on the mapping relationship information, the satellite may forward (or route) a data packet, thereby reducing a large amount of signaling interaction caused by establishing and maintaining a routing table in a conventional manner.

In addition, because the data packet is forwarded by the satellite through an inter-satellite link without the participation of any ground stations, not only is data transmission delay reduced, but also a spectrum resource between the satellite and the ground is saved.

With continued reference to the first aspect, in some implementations of the first aspect, a global network of the satellite communications system includes a plurality of IP networks, each IP network is allocated with an NID, an earth surface is divided into a plurality of ground areas, each ground area is allocated with a ground area identifier (EID), each EID corresponds to one or more NIDs, each NID uniquely corresponds to one EID, space is divided into a plurality of space areas, each space area is allocated with a space identifier (SID), and each SID uniquely corresponds to one EID.

In this application, the earth surface, space, and the network space are separately divided into a plurality of areas, and a fixed mapping relationship between these areas is established, to provide a good basis for forwarding data by the satellite.

With reference to the first aspect, in some implementations of the first aspect, when the first satellite enters a first space area identified by a first SID, a ground area covered by the first satellite is a first ground area identified by a first EID corresponding to the first SID, and the first satellite provides a service for a terminal device of a first NID corresponding to the first EID. When the first satellite leaves the first space area to a second space area identified by a second SID, the ground area covered by the first satellite is changed to a second ground area identified by a second EID corresponding to the second SID, and the first satellite provides a service for a terminal device of a second NID corresponding to the second EID.

In other words, as the first satellite travels, when the first satellite leaves the first space area (identified by the first SID) of the plurality of space areas to the second space area (identified by the second SID), an object served by the satellite changes, and the originally covered first EID is changed to the second EID, and the originally served first NID is changed to the second NID. The first SID identifies the first space area, the first EID identifies the first ground area, the first SID corresponds to the first EID, and the first NID corresponds to the first EID. The second SID identifies the second space area, the second EID identifies the second ground area, the second SID corresponds to the second EID, and the second NID corresponds to the second EID.

To be specific, each time the first satellite enters a space area, the first satellite modifies an SID recorded by the first satellite to an SID of the current space area, and also modifies a recorded NID and EID to an EID and an NID that correspond to the SID of the current space area. To be specific, each time a satellite enters a space area, the satellite modifies an SID recorded by the satellite to an SID of the current space area, and provides a service for a terminal device in an EID range corresponding to the SID.

With continued reference to the first aspect, in some implementations of the first aspect, the IP address of the destination device is allocated when the destination device accesses the satellite communications system, the destination device is located in a third ground area when accessing the satellite communications system, and the NID included in the IP address corresponds to the third ground area.

Herein, the third ground area is used to indicate a ground area in which the destination device is located when the destination device accesses the satellite communications system. The number "third" is merely used to distinguish from the "first ground area" and "second ground area," to describe the technical solution of this application more clearly.

With continued reference to the first aspect, in some implementations of the first aspect, the step where the first satellite determines, based on the NID, mapping relationship information, an ephemeris, and an identifier of a destination satellite corresponding to the NID includes: The first satellite determining, based on the NID and the mapping relationship information, an EID corresponding to the NID and an SID corresponding to the EID; and the first satellite determines the identifier of the destination satellite based on the ephemeris and the SID.

It should be understood that the ephemeris is a table of a precise location or track of a satellite that changes over time as the satellite orbits, and is a function of time. The ephemeris is determined by using a mathematical relationship between the six orbital parameters of Kepler's law and various values such as a running time, a running coordinate, a running orientation, and a running speed of the satellite. The six orbital parameters are, respectively, a square root of a semi major axis, an eccentricity, an argument of perigee, a mean anomaly, a longitude of an ascending node, and an orbital inclination. For detailed description of the parameters, refer to the prior art.

With continued reference to the first aspect, in some implementations of the first aspect, the mapping relationship information is recorded in a first mapping relationship table, and an entry in the first mapping relationship table includes the NID, the EID, and the SID. Alternately, the mapping relationship information is recorded in a second mapping relationship table and a third mapping relationship table, an entry in the second mapping relationship table includes the NID and the EID, and an entry in the third mapping relationship table includes the EID and the SID.

In this embodiment of this application, the form of storage of the mapping relationship information is not limited. For example, the mapping relationship that is between the EID, the NID, and the SID and that is recorded in the mapping relationship information may be recorded in one mapping table, or recorded in two mapping tables. This facilitates a satellite to quickly determine an SID corresponding to an NID carried in a received data packet, and to further determine, with reference to the ephemeris, a destination satellite corresponding to the NID.

According to a second aspect, this application provides a communications apparatus, and the communications apparatus implements a function of the method according to the first aspect and any possible implementation of that first aspect. The function may be implemented by using hardware, or may be implemented by executing corresponding software by hardware. The hardware or the software includes one or more units corresponding to the foregoing function.

According to a third aspect, this application provides a network device, including a processor and a memory. The memory is configured to store a computer program, and the processor is configured to invoke and run the computer program stored in the memory, so that the network device performs the method according to the first aspect or any possible implementation of that first aspect.

Herein, the network device in the third aspect may correspond to the first satellite in the first aspect.

According to a fourth aspect, this application provides a computer-readable storage medium. The computer-readable storage medium stores computer instructions. When the computer instructions are run on a computer, the computer is enabled to perform the method according to the first aspect or any possible implementation of that first aspect.

According to a fifth aspect, this application provides a chip, including a processor. The processor is configured to read and execute a computer program stored in a memory, to perform the method according to the first aspect or any possible implementation of that first aspect.

Optionally, the chip further includes a memory, and the memory and the processor are connected by using a circuit or a wire.

Further, optionally, the chip further includes a communications interface.

Optionally, the memory may be a physically independent unit, or may be integrated into the processor.

According to a sixth aspect, this application provides a computer program product. The computer program product includes computer program code. When the computer program code is run on a computer, the computer is enabled to perform the method according to the first aspect or any possible implementation of that first aspect.

According to a seventh aspect, this application provides a satellite communications system, including the first satellite according to the first aspect and any possible implementation of that first aspect.

DESCRIPTION OF EMBODIMENTS

The following describes technical solutions of this application with reference to the accompanying drawings.

Figure 1:
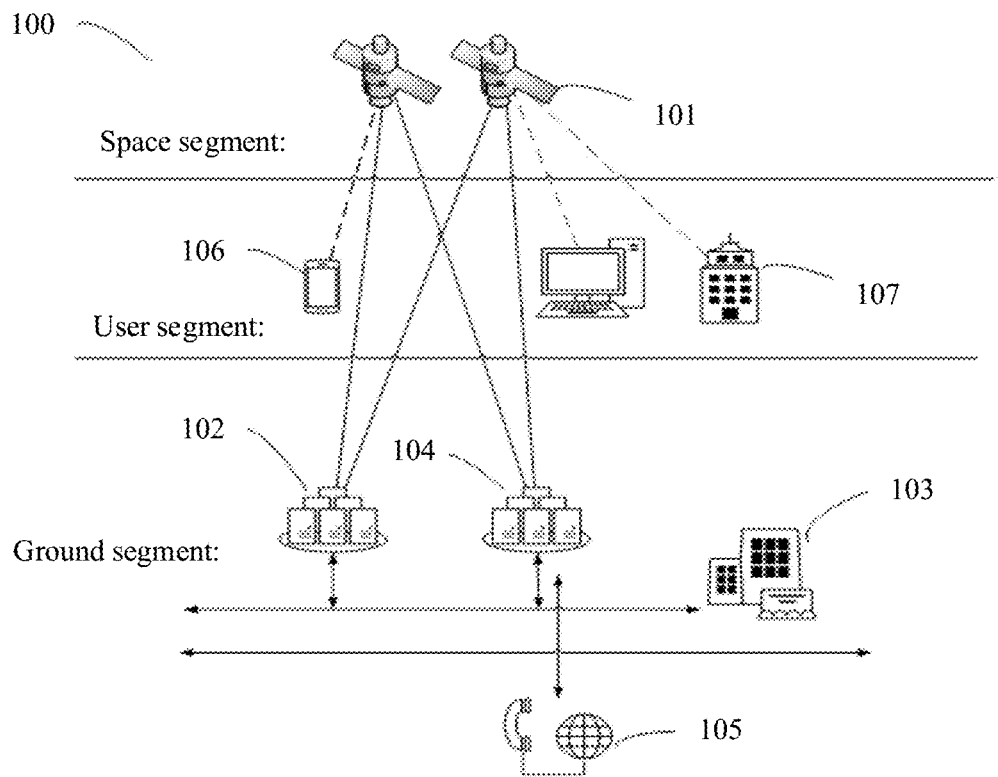
FIG. 1 is a schematic architectural diagram of a satellite communications system.

The technical solutions of this application may be applied to a satellite communications system. FIG. 1 is a schematic architectural diagram of a satellite communications system 100. The satellite communications system 100 usually includes three parts: a space segment, a ground segment, and a user segment. The space segment may include a geostationary earth orbit (GEO) satellite, a none-geostationary earth orbit (NGEO) satellite, or a plurality of satellite networks 101 including the geostationary earth orbit satellite and the none-geostationary earth orbit satellite. The ground segment usually includes a satellite measurement and control center 102, a network control center (NCC) 103, various gateway stations 104, and the like. The network control center is also referred to as a system control center (SCC). The user segment includes various terminal devices. The terminal device may be various mobile terminals 106, such as a mobile satellite phone, or may be various fixed terminals 107, such as a terrestrial communications station. In FIG. 1, a dashed line refers to a communication signal between a satellite and a terminal device. A solid line refers to a communication signal between a satellite and a device in the ground segment. A bi-directional arrow line refers to a communication signal between network elements in the ground segment.

In the satellite communications system 100, a satellite may also be referred to as a satellite base station. In FIG. 1, the satellite base station may transmit downlink data to a terminal device. The downlink data may be transmitted to the terminal device after channel coding and modulation mapping are performed on the downlink data. The terminal device may also transmit uplink data to the satellite base station. The uplink data may also be transmitted to the terminal device after channel coding and modulation mapping are performed on the uplink data.

The satellite measurement and control center 102 of the ground segment has functions of maintaining, monitoring, and controlling an orbital location and posture of a satellite, managing an ephemeris of the satellite, and so on. The network control center 103 has a user registration processing function, an identity acknowledgement function, a charging function, and other network management functions. In some satellite mobile communications systems, the network control center and the satellite measurement and control center are combined into one. The gateway station 104 has the following functions: call processing or exchanging, serving as an interface to a terrestrial communications network, and the like. The terrestrial communications network 105 is a component part of the ground segment of the satellite network, and is configured to exchange a data packet of a satellite with a core network and send the data packet to a final terminal device. The terrestrial communications network may be a public switched telephone network (PSTN), a public land mobile network (PLMN), or various other dedicated networks. Different terrestrial communications networks require the gateway station to have different gateway functions.

In some satellite communications systems 100, the space segment of the satellite communications system may be a multi-layer structure including a management satellite and one or more service satellites. In networking of the satellite communications system having this multi-layered structure, the space segment may include one or more management satellites and service satellites managed by these management satellites. The satellite or the satellite base station mentioned in this application is not limited to the managing satellite or the service satellite.

The satellite base station and the terminal device include but are not limited to communication by using the following communications systems: a global system for mobile communications (GSM) system, a code division multiple access (CDMA) system, and a wideband code division multiple access (WCDMA) system, a general packet radio service (GPRS), a long term evolution (LTE) system, an LTE frequency division duplex (FDD) system, and an LTE time division duplex (TDD), a universal mobile telecommunications system (UMTS), a global interconnected microwave access (WiMAX) communications system, a future fifth generation (5G) system, a new radio (NR), or the like.

In this embodiment of this application, the terminal device accesses a mobile satellite communications network by using the ground segment of the satellite communications system to perform mobile communication. The terminal device may be referred to as user equipment (UE), an access terminal, a subscriber unit, a subscriber station, a mobile station, a mobile console, a remote station, a remote terminal, a mobile device, a user terminal, a terminal, a wireless communication device, a user agent, or a user apparatus. The terminal device may be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, or a terminal device in a future evolved public land mobile network (PLMN). A terminal device represented by a satellite phone or an in-vehicle satellite system may directly communicate with a satellite. A fixed terminal represented by a terrestrial communications station can communicate with a satellite only after being relayed by a ground station.

A wireless transceiver antenna is installed on the terminal device to set and obtain a communication status, to complete the communication.

The satellite forwards a wireless signal to implement wireless communication between the satellite and the ground station or between satellites. The satellite may transmit information such as a signal for a telephone, a telegram, a fax, data, and a television.

Figure 2:
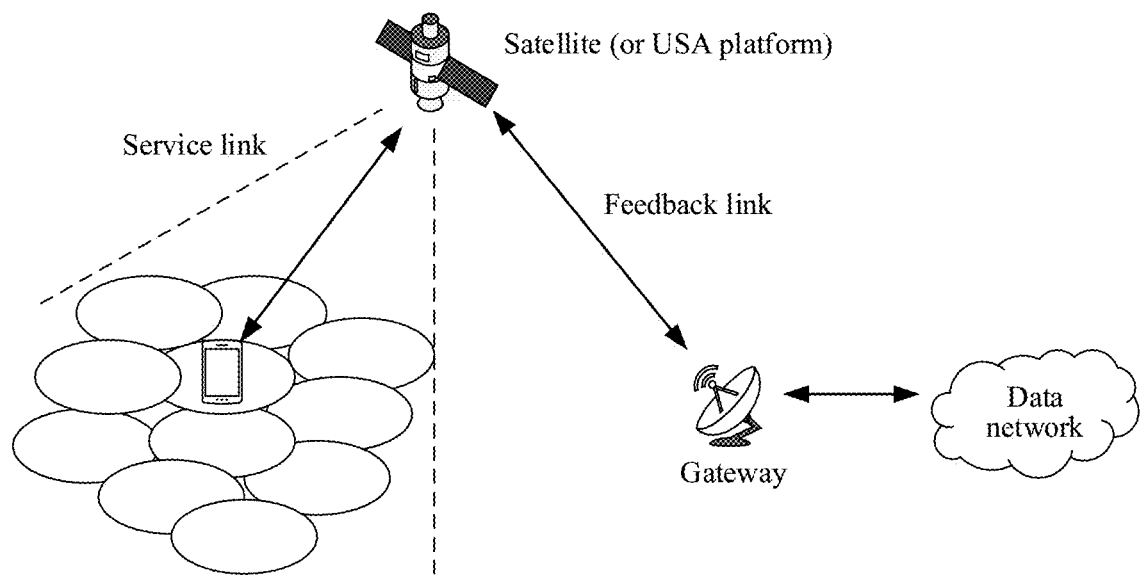
FIG. 2 is a schematic diagram of a typical satellite communications system.

FIG. 2 is a schematic diagram of a typical satellite communications system. As shown in FIG. 2, a terminal device on the ground establishes a connection to a satellite in space through a service link. In addition, the satellite communicates with a ground gateway through a feedback link. The ground gateway is also referred to as a ground station. The ground station is responsible for routing data of the terminal device to a phone, a television network, or the interne on the ground.

Usually, the satellite has two working modes, one called a transparent mode and the other called a regenerative mode. The satellite usually generates one or more wireless beams, and most of these beams are oval, which can be implemented by adjusting an antenna array on the satellite.

In signal transmission (also referred to as a transparent payload) in the transparent mode, the satellite mainly performs filtering, frequency conversion, and signal amplification on a wireless signal. Therefore, a signal waveform is simply repeated and remains unchanged. For signal transmission in the transparent mode, refer to FIG. 3.

Figure 3:
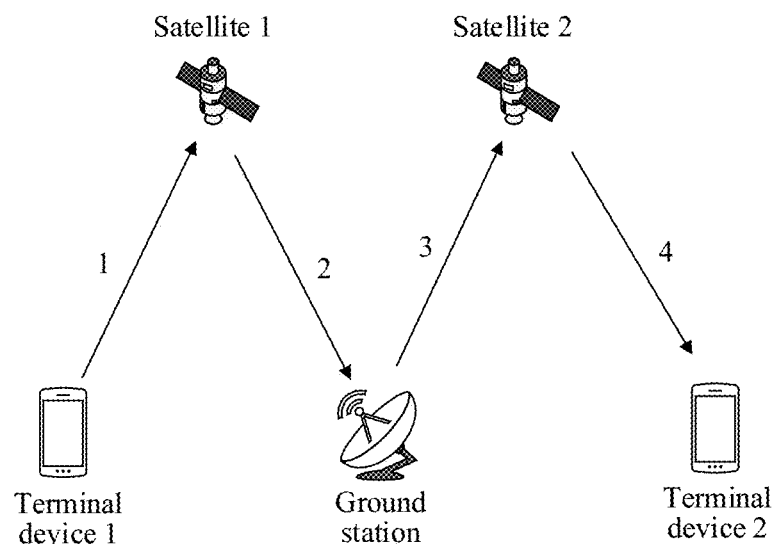
FIG. 3 is a schematic diagram of a data transmission process when a satellite is in a transparent mode.

FIG. 3 is a schematic diagram of a data transmission process when a satellite is in a transparent mode. In the transparent mode, a data of a terminal device usually reaches a ground station through a satellite, and then reaches a destination through the ground station. For example, as shown in FIG. 3, it is assumed that a terminal device 1 accesses a satellite 1, and a terminal device 2 accesses a satellite 2. If the terminal device 1 sends data to the terminal device 2, a data transmission process may be as follows: The terminal device 1 first sends the data to the satellite 1, and the satellite 1 directly forwards the data to a ground station. The ground station queries a routing table and sends the data to the satellite 2. The satellite 2 further forwards the data to the terminal device 2. It can be seen that in the transparent mode, the satellite has no routing function, and therefore, the satellite 1 cannot directly send the data to the satellite 2.

Usually, a distance between a satellite and a terminal device on the ground is more than 1000 km, for example, a distance between a geosynchronous satellite and the terminal device on the ground is 35786 km. A time required for sending data by one terminal device, forwarding the data by a satellite, routing the data by a ground station, and receiving the data by another terminal device is more than 500 milliseconds. Therefore, when transmitting data in this working mode, the satellite not only occupies a ground-space spectrum resource, but also has a relatively large transmission delay.

However, in signal transmission (also referred to as a regenerative payload) in the regenerative mode, in addition to performing filtering and frequency and signal amplification on a wireless signal, the satellite may also perform signal demodulation, decoding, data packet exchanging or routing, and coding and modulation. Therefore, a satellite working in the regenerative mode basically provides some or all of the functions found in a base station in a cellular network.

Figure 4:
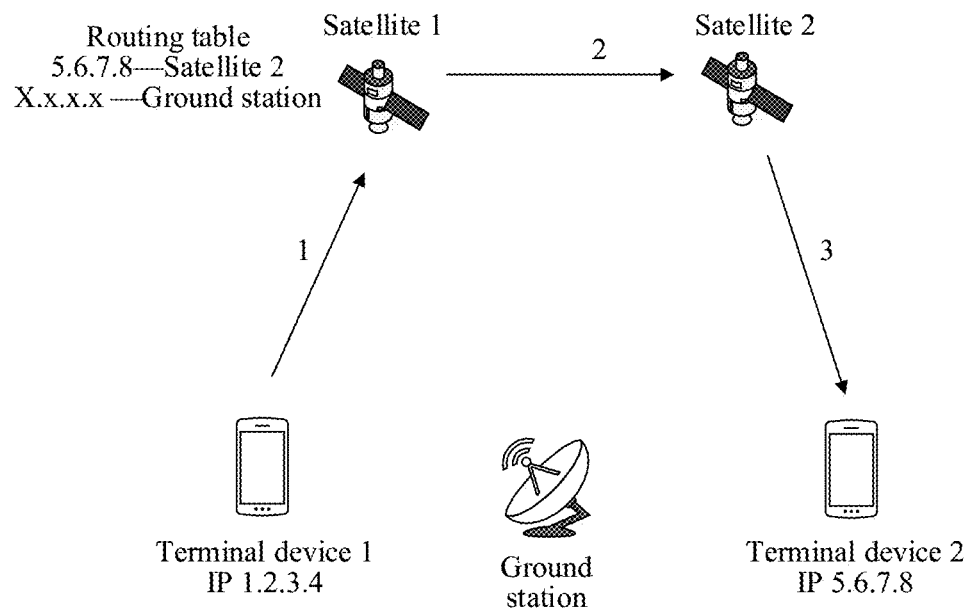
FIG. 4 is a schematic diagram of a data transmission process when a satellite is in a regenerative mode.

FIG. 4 is a schematic diagram of a data transmission process when a satellite is in a regenerative mode. As shown in FIG. 4, a wireless link (that is, an inter-satellite link) is established between satellites, and an IP-based routing function is added to the satellites. In this way, data can be simply exchanged or routed between the satellites, and then transmitted to a terminal device on the ground, so that the transparent mode can be avoided. Here, data is first transmitted from a satellite in which a source terminal device is located to a ground station, and then transmitted from the ground station to a satellite in which a destination terminal device is located, thereby reducing transmission delay.

However, the satellite moves rapidly, especially a low-orbit satellite, and a time for the low-orbit satellite to circle the earth is about 100 minutes. A time for a satellite to serve a terminal device on the ground is about 10 minutes. Therefore, when an IP routing table is established on the satellite, location information needs to be frequently updated.

FIG. 4 is used as an example, and it is assumed that FIG. 4 shows a low-orbit satellite. At about 8:00, a satellite 1 records a satellite 2 (5.6.7.8), indicating that a terminal device 2 needs to perform forwarding by using the satellite 2, and 5.6.7.8 is an IP address of the terminal device 2. After a period of time (about a few minutes), because the satellite 2 travels along an orbit, the satellite 2 no longer serves the terminal device 2. It is assumed that another satellite serving the terminal device 2 is a satellite 3 (not shown). In this case, the record carried by satellite 1 also needs to be updated to the satellite 3 (5.6.7.8). In addition, because the satellite 1 also moves, the satellite 1 may no longer serve the terminal device 1. For example, the satellite serving the terminal device 1 may change to satellite 2. In this case, the satellite 2 needs to update its routing table information, and record the information required for forwarding data by the terminal device 1, for example, record the satellite 3 (5.6.7.8). In other words, each satellite needs to add, to a routing table, information required for forwarding data by a terminal device in current coverage, and delete information required for forwarding data by a terminal device that is originally covered but not currently covered. It can be seen that because of the movements of the satellites, the routing table on each satellite needs to be frequently updated. It can be seen from practice data that an update period of the routing table is about 30 seconds to one minute.

As a result, the entire satellite communications system bears huge signaling transmission and occupies a very large quantity of air interface resources.

Therefore, this application provides a data packet routing method to reduce signaling overhead associated with data transmission performed by a satellite communications system, and to also reduce utilization of an air interface resource.

In this application, an earth surface and space are divided, so that a location of a terminal device may be determined based on a ground area and a space location of a satellite, thereby simplifying maintenance of a routing table, and providing a good basis for data forwarding.

It should be understood that a typical satellite communications system is usually designed with a specific quantity of orbits, and a specific quantity of satellites are disposed on each orbit. For example, an iridium satellite system is designed with six orbits, 11 satellites are uniformly distributed on each orbit, and there are 66 satellites in total. The 66 satellites form a complete satellite communications system.

In this application, the earth surface is divided into a plurality of ground areas based on a quantity of orbits in the satellite communications system and a quantity of satellites disposed on each orbit, and an identifier (ID) is allocated to each ground area, which is referred to as an earth surface identifier (EID). In the satellite constellation system, the EID is globally unique and fixed.

In addition, the space is divided into a plurality of space areas, and an ID is allocated to each space area, which is referred to as a space identifier (SID).

In addition, a one-to-one mapping relationship is established between the ground area and the space area, that is, each EID corresponds to one SID.

It should be understood that the EID is an identifier of the earth surface, and may reflect a ground location of a terminal device. The SID is an identifier of the space, and reflects a location of a satellite in space. When a satellite is within a space area, the satellite has an SID of the space area. When the satellite leaves a space area, an SID owned by the satellite changes accordingly. In other words, when a satellite travels from one space area to another space area, the satellite has an SID that changes from that of the first space area to that of the next space area.

For example, when a satellite is within a first space area, the satellite has an SID (it is assumed that the SID is recorded as a first SID) of the first space area, and the satellite provides a service for a terminal device in a first ground area corresponding to the first SID. Herein, an identifier of the first ground area is recorded as a first EID. As the satellite moves, when the satellite leaves the first space area and runs into a second space area, an object served by the satellite changes, the originally covered first EID is changed to a second EID, and the originally served first NID is changed to a second NID. The satellite no longer serves the terminal device in the first ground area identified by the first EID, but provides a service for a terminal device in a second ground area identified by the second EID.

Optionally, if a plurality of satellites simultaneously exist in a given space area, an SID of the space area may be distinguished by using device IDs of the plurality of satellites.

Alternatively, the device ID of the satellite is referred to as a device identifier (DID).

Based on the above definition, it is easy to understand that an SID of a satellite changes regularly in a process in which the satellite orbits the earth.

The iridium satellite system is again used as an example. The iridium satellite system includes six orbits, and each orbit includes 11 satellites. Based on a design principle in this application, an entire earth surface may be divided into 66 ground areas, corresponding to 66 EIDs. One orbit is used as an example, and SIDs of satellites on that orbit continuously change from 1 to 11. Therefore, the SIDs of the satellites periodically change from 1 to 11, which are respectively recorded as an SID 1, an SID 2, . . . , and an SID 11. Assuming that a period for a satellite to complete an orbit around the earth is 110 minutes, there will be a correspondence shown in Table 1 between a time and an SID of a satellite 1 on the orbit.

TABLE 1

| Time (minute) | SID |
|---|---|
| 0-10 | 1 |
| 10-20 | 2 |
| 20-30 | 3 |
| 30-40 | 4 |
| 40-50 | 5 |
| 50-60 | 6 |
| 60-70 | 7 |
| 70-80 | 8 |

TABLE 1-continued

| Time (minute) | SID |
|---|---|
| 80-90 | 9 |
| 90-100 | 10 |
| 100-110 | 11 |
| 110-120 | 1 |
| 120-130 | 2 |
| . . . | . . . |

It should be understood that the satellite 1 herein refers to a satellite that is on the orbit and that is located in a space area identified by the SID 1.

When a terminal device accesses a satellite network, the satellite allocates a globally unique IP address to the accessed terminal device based on an Internet Protocol (IP) plan of the entire network. An IP address includes an internet identifier (NID) and a host ID.

In this application, it is specified that an EID corresponds to a fixed NID. Optionally, one EID may correspond to one NID, or one EID may correspond to a plurality of NIDs. However, each NID uniquely corresponds to one EID, and the NID is globally unique.

For example, when there is a relatively large quantity of users in a ground area, more than one IP network may be allocated to the ground area. In this case, an EID of the ground area may correspond to a plurality of NIDs.

A globally unique IP address is allocated to a terminal device when the terminal device accesses satellite communication. This IP address remains unchanged while service continues. In addition, an IP address of a terminal device does not change with location movement of the terminal device, and does not change with movement of the satellite. Only when the terminal device exits a network, the IP address of the terminal device is released (or recycled), so that a network side may re-allocate, for reuse, the IP address to a terminal device that newly accesses the network.

It should be understood that on the basis of establishment of a mapping relationship between an EID and an NID, allocation of an IP address of a terminal device is related to a ground area in which the terminal device is located when the terminal device accesses a satellite communications system. For example, a terminal device is located in a ground area when the terminal device accesses satellite communication, and it is assumed that the ground area is recorded as a third ground area. The third ground area has its own EID (recorded as a third EID). The third EID has a corresponding NID. An NID included in an IP address allocated by the network side to the terminal device is the NID corresponding to the third EID.

Figure 5:
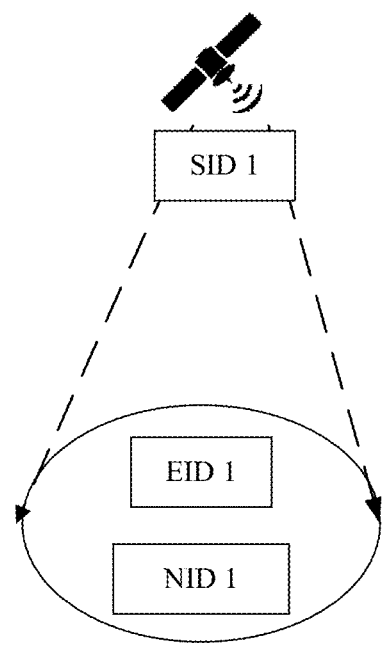
FIG. 5 shows a mapping relationship between an EID, an SID, and an NID of a single satellite.
Figure 6:
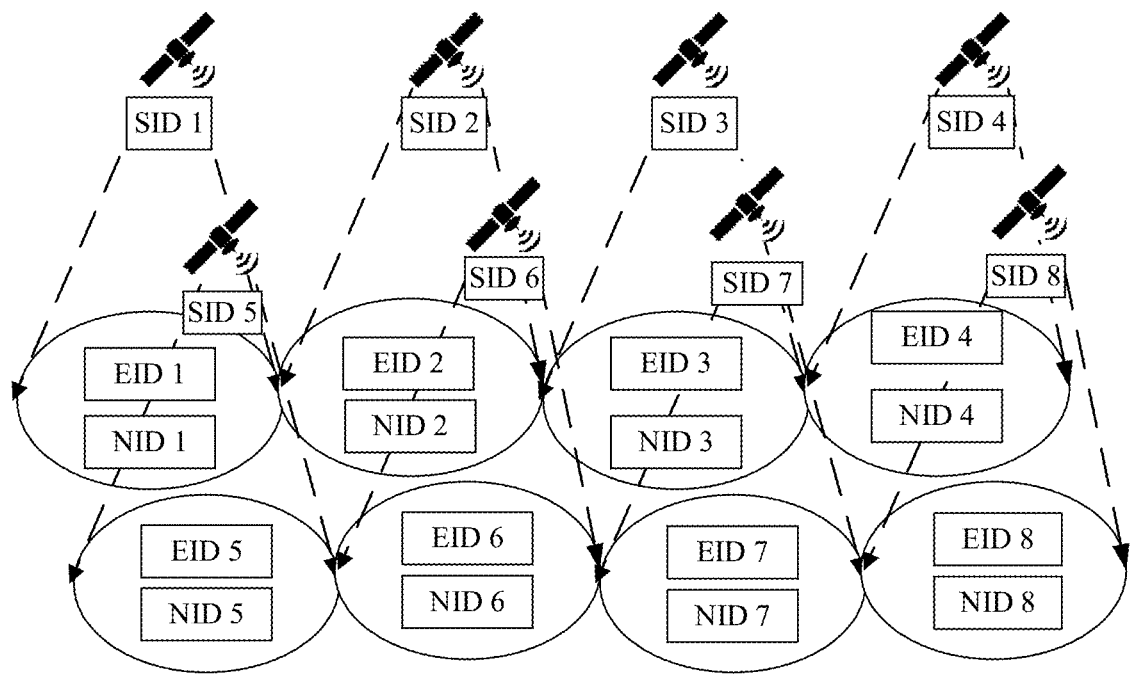
FIG. 6 shows a mapping relationship between EIDs, SIDs, and NIDs of a plurality of satellites.

Based on this design principle, it can be seen that in the satellite communications system, there is a fixed mapping relationship between an EID, an SID, and an NID. Refer to FIG. 5 and FIG. 6.

FIG. 5 shows a mapping relationship between an EID, an SID, and an NID of a single satellite.

FIG. 6 shows a mapping relationship between EIDs, SIDs, and NIDs of a plurality of satellites.

It can be seen from FIG. 5 and FIG. 6 that in this application, a fixed mapping relationship between the EID, the SID, and the NID is established to simplify updating and maintenance of a conventional routing table, and help transmit a data packet on a satellite.

On the basis of this fixed mapping relationship, each satellite in the satellite communications system maintains information that records the mapping relationship between the EID, the SID, and the NID, and such information is referred to as mapping relationship information in this application.

Optionally, the mapping relationship information may be recorded by using one mapping table, or may be recorded by using a plurality of mapping tables.

For example, when the mapping relationship information is recorded by using one mapping table, it is assumed that the mapping table is recorded as a first mapping table. The first mapping table may be shown in Table 2.

TABLE 2

| NID | EID | SID |
|---|---|---|
| Network 1 1.x.x.x | Ground area 1 | Space area 1 |
| Network 2 2.x.x.x | Ground area 2 | Space area 2 |
| Network 3 3.x.x.x | Ground area 3 | Space area 3 |
| . . . | . . . | . . . |
| Network N N.x.x.x | Ground area N | Space area N |

As shown in Table 2, the ground area 1, the ground area 2, . . . , and the ground area N are several ground areas obtained by dividing the earth surface.

As another example, when the mapping relationship information is recorded by using two mapping tables, it is assumed that the two mapping tables are respectively recorded as a second mapping table and a third mapping table, which are respectively shown in the following Table 3 and Table 4.

TABLE 3

| NID | EID |
|---|---|
| Network 1 1.x.x.x | Ground area 1 |
| Network 2 2.x.x.x | Ground area 2 |
| Network 3 3.x.x.x | Ground area 3 |
| . . . | . . . |
| Network N N.x.x.x | Ground area N |

TABLE 4

| EID | SID |
|---|---|
| Ground area 1 | Space area 1 |
| Ground area 2 | Space area 2 |
| Ground area 3 | Space area 3 |
| . . . | . . . |
| Ground area N | Space area N |

Each satellite maintains the mapping relationship information of the EID, the SID, and the EID. Based on the mapping relationship information, each time an NID is given, the satellite can determine an SID corresponding to the NID.

It should be noted that in Table 2 to Table 4, that each EID uniquely corresponds to one NID is merely an example. As described above, one EID may alternatively correspond to a plurality of NIDs, but each NID uniquely corresponds to one EID.

In the technical solution of this application, each satellite in the satellite communications system maintains the mapping relationship information. The mapping relationship information may be configured when a satellite network is initialized. As long as a satellite constellation does not change, the mapping relationship that is between the NID, the EID, and the SID and that is recorded in the mapping relationship information does not need to be updated.

It can be seen from content recorded in the mapping relationship information that the mapping relationship information is updated at a very low frequency, and needs to be updated only when a new satellite is added or an existing satellite ceases to be operational. Basically, an update period of the mapping relationship information may be in a unit of year.

A first satellite in the satellite communications system is used as an example below to describe a process of forwarding a data packet by the satellite based on the fixed mapping relationship that is between the EID, the NID, and the SID that is stored in the maintained mapping relationship information.

It should be understood that the first satellite herein may be any satellite in the satellite communications system.

The first satellite receives a data packet, and the data packet carries an IP address of a destination device. As described above, the IP address includes an NID and a host ID. For ease of description, the NID included in the IP address is recorded below as a destination NID.

The first satellite may determine, based on the destination NID and the stored mapping relationship information, an SID corresponding to the destination NID. Further, the first satellite obtains, through calculation with reference to a current time based on an ephemeris and the SID corresponding to the destination NID, a satellite identifier corresponding to the destination NID, to determine a destination satellite. Further, the first satellite sends the data packet to the destination satellite through an inter-satellite link between the first satellite and the destination satellite.

Herein, the destination satellite is a satellite that serves a destination device at the current time.

In addition, it should be understood that the ephemeris is a table of a precise location or track of a satellite that changes over time as the satellite runs, and is a function of time. The ephemeris determines, by using a mathematical relationship between six orbital parameters of Kepler's law, various values such as a running time, a running coordinate, a running orientation, and a running speed of the satellite. The six orbital parameters are respectively a square root of a semi major axis, an eccentricity, an argument of perigee, a mean anomaly, a longitude of an ascending node, and an orbital inclination. For detailed description of the parameters, refer to the prior art.

After receiving the data packet, the destination satellite may learn a device identifier of the destination device based on the IP address carried in the data packet. The destination satellite checks network access information of the destination device based on the identifier of the destination device, to determine whether the destination device is located within the network coverage of the destination satellite at the current time. If the destination satellite determines that the destination device is located in the network coverage of the destination satellite at the current time, the destination satellite forwards the data packet to the destination device. If the destination satellite determines that the destination device is switched to another satellite at the current time, that is, the destination device is not located in the network coverage of the destination satellite, the destination satellite forwards the data packet to the satellite that provides service for the destination device at the current time.

Figure 7:
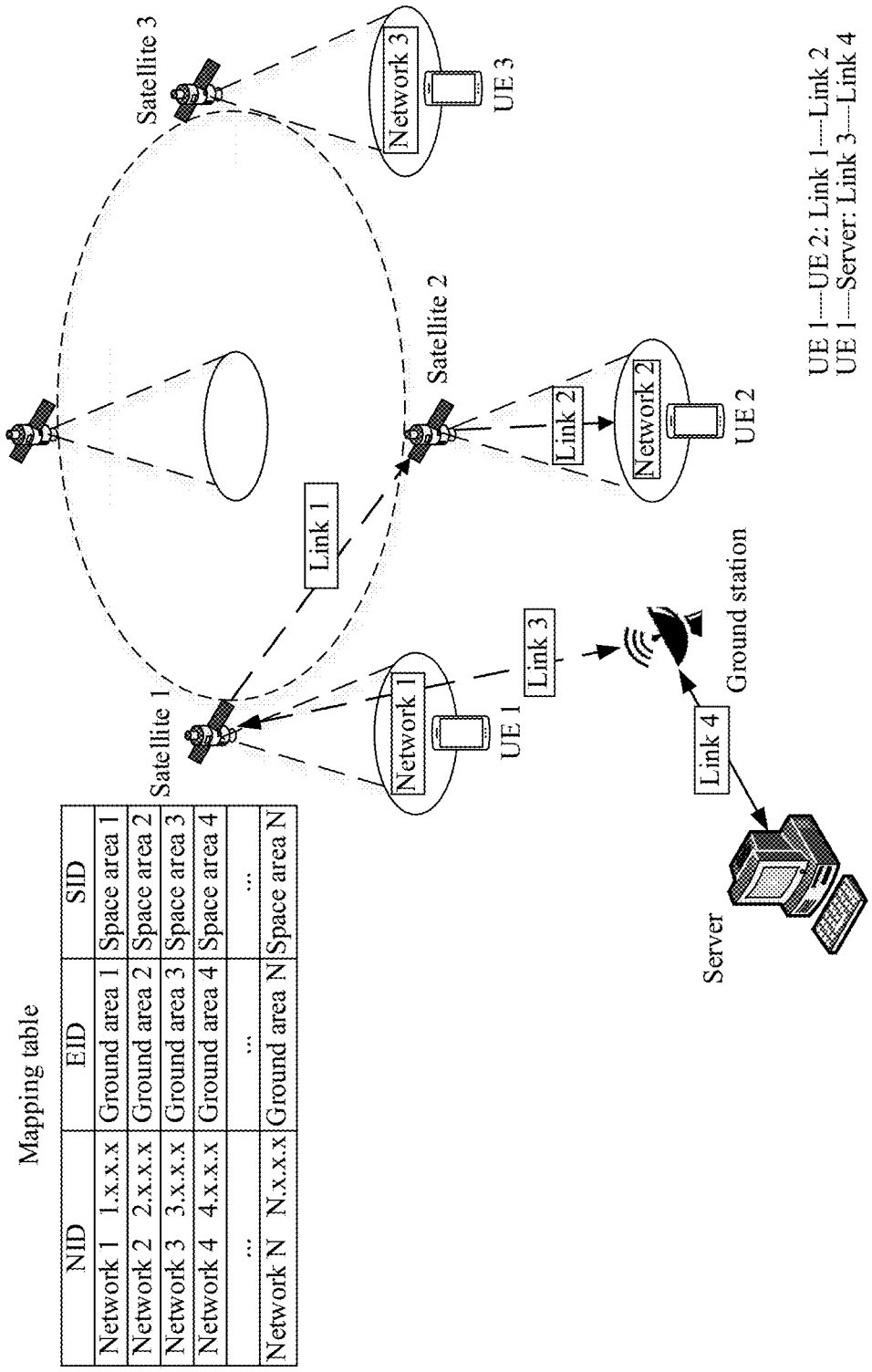
FIG. 7 is an example of a data packet processing method according to this application.

An example is used for description below with reference to FIG. 7 and FIG. 8. FIG. 7 is an example of a data packet processing method according to this application.

It is assumed that a terminal device 1 needs to send an IP data packet to a terminal device 2.

As shown in FIG. 7, UE 1 accesses a satellite 1 and obtains an IP address NID1_UE1 allocated to the UE 1 by the satellite 1. UE 2 accesses a satellite 2 and obtains an IP address NID2_UE2 allocated to the UE 2 by the satellite 2. In addition, the satellite 1 and the satellite 2 access a network on the ground by using respective ground stations, and communicate with various servers on the ground.

301. The UE 1 sends an IP data packet to the satellite 1 through an air interface.

Correspondingly, the satellite 1 receives the IP data packet from the UE 1.

302. After successfully decoding the IP data packet through baseband processing, the satellite 1 checks a destination address of the IP data packet. The destination address of the IP data packet is the IP address NID2_UE2 of the UE 2.

303. The satellite 1 determines, based on the destination address of the data packet, mapping relationship information, and an ephemeris, that a physical interface corresponding to an NID 2 is the satellite 2.

It should be understood that the physical interface herein is a destination satellite.

Particularly, if an NID included in the IP address cannot be found in a mapping table (for example, Table 2 or Table 3), the satellite considers by default that a physical interface corresponding to the NID is a ground station.

304. The satellite 1 sends the IP data packet to the satellite 2 through an inter-satellite link (a link 1 shown in FIG. 7).

Correspondingly, the satellite 2 receives the IP data packet from the satellite 1.

305. The satellite 2 searches for network access information of the UE 2 based on the destination address NID2_UE2 of the IP data packet.

Based on the network access information of the UE 2, the satellite 2 knows that the UE 2 falls within network coverage of the satellite 2.

306. The satellite 2 sends the IP data packet to the UE 2 through an air interface (a link 2 shown in FIG. 7).

In another example shown in FIG. 7, it is assumed that the UE 1 needs to access a server on the ground.

401. The UE 1 sends an IP data packet to the satellite 1.

The satellite 1 receives the IP data packet from the UE 1. A destination address of the IP data packet is X.x.x.x.

402. The satellite 1 determines, based on the destination address of the IP data packet, mapping relationship information, and an ephemeris, a physical interface corresponding to the destination address of the IP data packet.

After calculation, the satellite 1 determines that the physical interface corresponding to the destination address is a default gateway, and needs to send the IP data packet to a ground station.

403. The satellite 1 sends the IP data packet to a ground station through a link 3.

The ground station receives the IP data packet from the satellite 1.

404. The ground station learns the destination address by performing air interface processing on the IP data packet, and sends the IP data packet to a server based on conventional routing.

Herein, the conventional routing means that the ground station routes the data packet. A specific method may be the same as that in the prior art, and details are not described herein.

A process in which a satellite routes a data packet is provided below with reference to FIG. 8.

Figure 8:
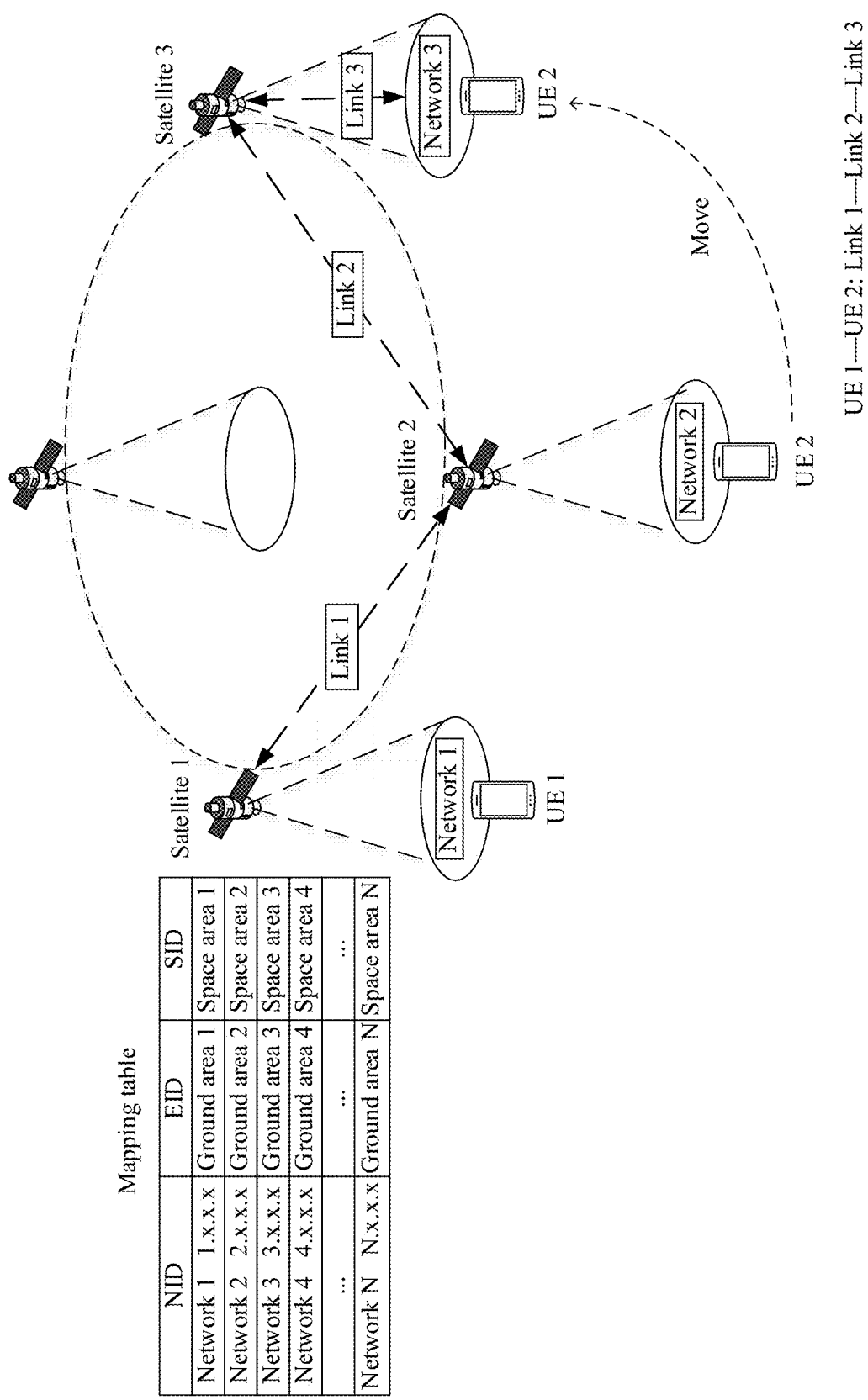
FIG. 8 is another example of a data packet processing method according to this application.

FIG. 8 is another example of a data packet processing method according to this application.

As shown in FIG. 8, UE 1 accesses a satellite 1 and obtains an IP address NID1_UE1 allocated to the UE 1 by a network side. UE 2 accesses a satellite 2 and obtains an IP address NID2_UE2 allocated to the UE 2 by the network side.

Herein, an IP address of a terminal device is usually allocated to the terminal device by a core network when the terminal device accesses a satellite communications network.

After a period of time t, the UE 2 moves from network coverage of the satellite 2 to network coverage of a satellite 3. A satellite providing a service for the UE 2 is switched once.

However, it can be seen based on the above definition of an NID that although the UE 2 moves from the network coverage of the satellite 2 to the network coverage of the satellite 3, the IP address of the UE 2 remains unchanged and is still NID2_UE2.

It is assumed that the UE 1 needs to send an IP data packet to the UE 2.

501. The UE 1 sends an IP data packet to the satellite 1 through an air interface.

Correspondingly, the satellite 1 receives the IP data packet from the UE 1.

502. After successfully decoding the IP data packet through baseband processing, the satellite 1 checks a destination address of the IP data packet. The destination address of the IP data packet is the IP address NID2_UE2 of the UE 2.

503. The satellite 1 determines, based on the destination address of the data packet, mapping relationship information, and an ephemeris, that a physical interface corresponding to an NID 2 is the satellite 2.

504. The satellite 1 sends the IP data packet to the satellite 2 through an inter-satellite link (a link 1 shown in FIG. 8).

Correspondingly, the satellite 2 receives the IP data packet from the satellite 1.

505. The satellite 2 searches for network access information of the UE 2 based on the destination address NID2_UE2 of the IP data packet.

Based on the network access information of the UE 2, the satellite 2 knows that the UE 2 is switched to the satellite 3. In this case, the satellite 2 sends the IP data packet to the satellite 3 through an inter-satellite link (a link 2 shown in FIG. 8).

Correspondingly, the satellite 3 receives the IP data packet from the satellite 2.

506. The satellite 3 searches for the network access information of the UE 2 based on the destination address of the IP data packet, and determines that the UE 2 is located in the network coverage of the satellite 3.

507. The satellite 3 sends the IP data packet to the UE 2 through an air interface (a link 3 shown in FIG. 8).

A data packet routing method provided in this application is described above in detail.

According to the technical solution provided in this application, a data packet is forwarded and routed between satellites by dividing an earth surface, space, and network space, and data is forwarded through an inter-satellite link, thereby reducing a transmission delay of a data packet, and reducing use of a spectrum resource between a satellite and the ground.

In addition, compared to establishing and maintaining a conventional routing table, maintenance of the mapping relationship information is very simple in this application. The mapping relationship information only needs to be initially configured, and does not need to be updated frequently, thereby reducing a large amount of signaling interaction caused by routing table establishment and maintenance.

A communications apparatus provided in this application is described below.

Figure 9:
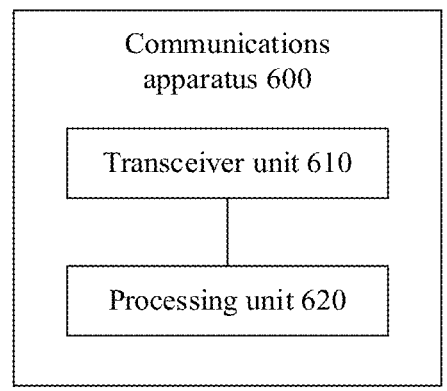
FIG. 9 is a schematic diagram of a communications apparatus according to this application.

FIG. 9 is a schematic diagram of a communications apparatus 600 according to this application. The communications apparatus 600 includes a transceiver unit 610 and a processing unit 620.

The transceiver unit 610 is configured to receive a data packet. The data packet carries an IP address of a destination device, and the IP address of the destination device includes a network identifier (NID).

The processing unit 620 is configured to determine, based on the NID included in the IP address, mapping relationship information, an ephemeris, and an identifier of a destination satellite corresponding to the NID. The mapping relationship information is used to record a mapping relationship between the NID, an earth surface identifier (EID), and a space identifier (SID).

The transceiver unit 610 is further configured to send the data packet to the destination satellite.

Optionally, the transceiver unit 610 may be replaced by a receiving unit and/or a sending unit.

For example, when performing a receiving step, the transceiver unit 610 may be replaced by the receiving unit. When performing a sending step, the transceiver unit 610 may be replaced by the sending unit.

In an implementation, the communications apparatus 600 may completely correspond to the first satellite in the method embodiment.

In this implementation, the transceiver unit 610 shown in FIG. 9 may be a transceiver. The transceiver has a sending function and/or a receiving function. The transceiver may be replaced by a receiver and/or a transmitter. The processing unit 620 may be a processor. The transceiver and the processor are configured to perform a step or processing performed by the first satellite in each method embodiment.

Optionally, the communications apparatus 600 further includes a memory.

For example, the transceiver receives a data packet. The processor determines, based on an IP address of a destination device carried in the data packet received by the transceiver, an ephemeris, an NID included in the IP address, and an identifier of a destination satellite corresponding to the NID. The transceiver sends the data packet to the destination satellite.

For another example, when the first satellite travels in a first space area (identified by a first SID), the processor records a ground area covered by the first satellite as a first EID, and an NID served by the first satellite as a first NID. The first EID corresponds to the first SID, and the first NID corresponds to the first EID. When the first satellite leaves the first space area to enter a second space area (identified by a second SID), the processor changes the ground area covered by the first satellite to a second EID corresponding to the second SID, and changes the first NID served by the first satellite to a second NID. The second EID corresponds to the second SID, and the second NID corresponds to the second EID.

Optionally, the transceiver unit 610 may be a radio frequency apparatus, and the processing unit 620 may be a baseband apparatus.

In another implementation, the communications apparatus 600 may be a chip or an integrated circuit. In this implementation, the transceiver unit 610 shown in FIG. 9 may be a communications interface. Optionally, the communications interface may be an input/output interface or a transceiver circuit. The processing unit 620 may be a processing apparatus. Some or all functions of the processing apparatus may be implemented by software.

In an implementation, some or all functions of the processing apparatus may be implemented by software. In this implementation, the processing apparatus may include a memory and a processor. The memory is configured to store a computer program. The processor reads and executes the computer program stored in the memory, to perform processing implemented in the first satellite in each embodiment, for example, by performing the processing that is described above and that is performed by the processing unit 620.

Optionally, the processing apparatus may include only the processor, and the memory configured to store the computer program is located outside the processing apparatus. The processor is connected to the memory by using a circuit/wire to read and execute the computer program stored in the memory.

In another implementation, some or all functions of the processing apparatus may be implemented by hardware. In this implementation, the processing apparatus includes an input interface circuit, a logic circuit, and an output interface circuit. The input interface circuit is configured to obtain an IP address carried in a data packet and an NID included in the IP address. The logic circuit is configured to determine, based on the NID, mapping relationship information, an ephemeris, and a physical interface corresponding to the NID. The output interface circuit is configured to output the physical interface corresponding to the NID.

Optionally, the output interface circuit outputs an identifier of the physical interface, for example, an identifier of a destination satellite.

Optionally, if the logical circuit does not find, in an NID recorded in the mapping relationship information, the NID carried in the IP address, the logical circuit outputs an identifier of a ground station.

Optionally, the communications apparatus 600 may be a router.

Figure 10:
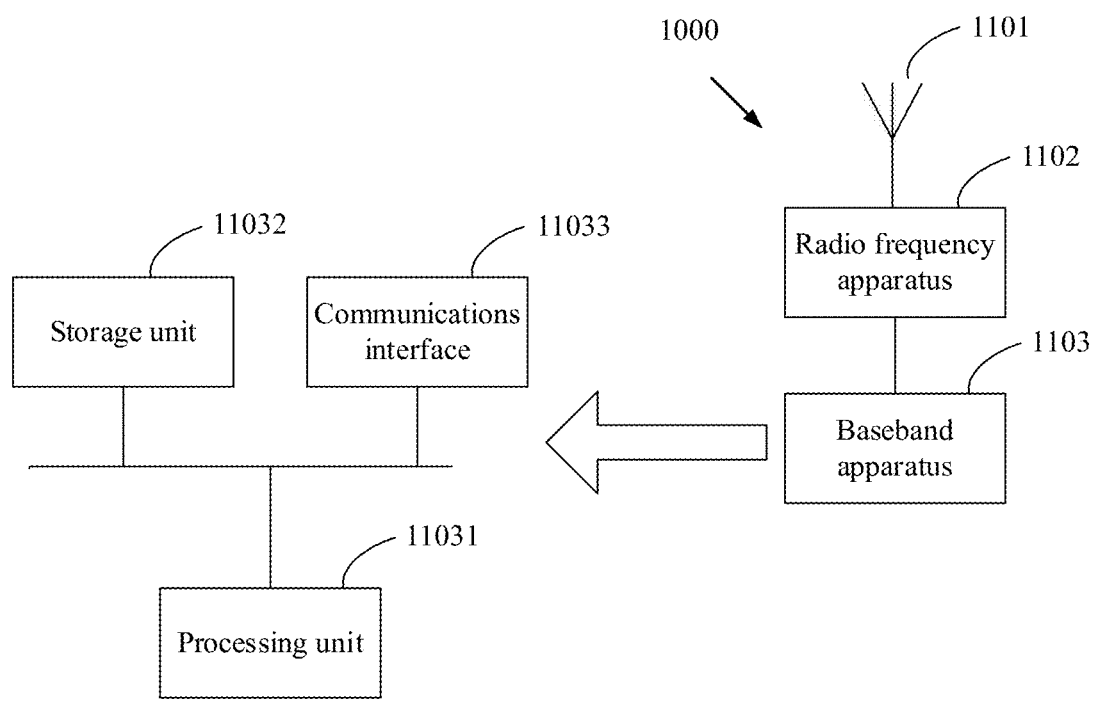
FIG. 10 is a schematic structural diagram of a network device according to this application.

FIG. 10 is a schematic structural diagram of a network 1000 according to this application. The network device 1000 may correspond to the satellite in each method embodiment. As shown in FIG. 10, the network device 1000 includes an antenna 1101, a radio frequency apparatus 1102, and a baseband apparatus 1103. The antenna 1101 is connected to the radio frequency apparatus 1102. In an uplink direction, the radio frequency apparatus 1102 receives a signal from a terminal device by using the antenna 1101, and sends the received signal to the baseband apparatus 1103 for processing. In a downlink direction, the baseband apparatus 1103 generates a signal that needs to be sent to the terminal device, and sends the generated signal to the radio frequency apparatus 1102. The radio frequency apparatus 1102 transmits the signal by using the antenna 1101.

The baseband apparatus 1103 may include one or more processing units 11031. The processing unit 11031 may be a processor.

In addition, the baseband apparatus 1103 may further include one or more storage units 11032 and one or more communications interfaces 11033. The storage unit 11032 is configured to store a computer program and/or data. The communications interface 11033 is configured to exchange information with the radio frequency apparatus 1102. The storage unit 11032 may be a memory, and the communications interface 11033 may be an input/output interface or a transceiver circuit.

Optionally, the storage unit 11032 may be a storage unit on a same chip as the processing unit 11031, that is, an on-chip storage unit; or may be a storage unit on a chip different from that of the processing unit, that is, an off-chip storage unit. This is not limited in this application.

In an implementation, when the communications apparatus 600 shown in FIG. 9 completely corresponds to the first satellite in the method embodiment, the communications apparatus 600 may be implemented by the network device 1000 shown in FIG. 10, or in other words, the first satellite may be the network device 1000 shown in FIG. 10. For example, the transceiver unit 610 of the communications apparatus 600 shown in FIG. 9 may be the radio frequency apparatus 1102 shown in FIG. 10. The processing unit 620 may be the baseband apparatus 1103 shown in FIG. 10.

In addition, this application further provides a satellite communications system, including one or more first satellites (that is, the satellite 1) in the method embodiment.

This application further provides a computer-readable storage medium. The computer-readable storage medium stores a computer program. When the computer program is executed by a computer, the computer is enabled to perform an operation and/or processing performed by the first satellite in any given method embodiment.

This application further provides a computer program product. The computer program product includes computer program code. When the computer program code is run on a computer, the computer is enabled to perform an operation and/or processing performed by the first satellite in any given method embodiment.

This application further provides a chip, and the chip includes a processor. A memory configured to store a computer program is disposed independent of the chip. The processor is configured to execute the computer program stored in the memory, to perform an operation and/or processing performed by the first satellite in any given method embodiment.

Further, the chip may include a communications interface. The communications interface may be an input/output interface, an input/output circuit, or the like. Further, the chip may include the memory.

The processor in this embodiment of this application may be an integrated circuit chip, and has a signal processing capability. In an implementation process, steps in the foregoing method embodiments can be implemented by using a hardware integrated logical circuit in the processor, or by using instructions in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The general purpose processor may be a microprocessor, or the processor may be any conventional processor or the like. Steps of the methods disclosed with reference to the embodiments of this application may be directly executed and accomplished by using a hardware encoding processor, or may be executed and accomplished by using a combination of hardware and software modules in the encoding processor. A software module may be located in any mature storage medium in the art, such as a random access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

The memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example, but not limitation, many forms of RAM are available, such as static random access memory (SRAM), dynamic random access memory (DRAM), synchronous dynamic random access memory (SDRAM), double data rate synchronous dynamic random access memory (DDR SDRAM), enhanced synchronous dynamic random access memory (ESDRAM), synchronous connected dynamic random access memory (SLDRAM) and direct memory bus random access memory (DRRAM). It should be noted that the memory of the systems and methods described in this specification includes but is not limited to these and any memory of another suitable type.

A person of ordinary skill will understand that, with reference to the examples described in the embodiments disclosed in this specification, units and algorithm steps may be implemented by electronic hardware, or a combination of computer software and electronic hardware, and depends on specific applications and design constraints of the technical solutions. A person skilled in the art may use different methods to implement the described functions for each particular application, but it should not be considered that the implementation goes beyond the scope of this application.

The units described as separate parts may or may not be physically separate, and parts displayed as units may or may not be physical units, may be located in one position, or may be distributed on a plurality of network units. Some or all of the units may be selected according to actual requirements to achieve the objectives of the embodiments of this application.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A data packet processing method, applied to a satellite communications system, wherein the method comprises:

receiving, by a first satellite, a data packet that carries an Internet Protocol (IP) address of a destination device, and the IP address comprises a network identifier (NID);

determining, by the first satellite based on the NID, mapping relationship information, and an ephemeris, an identifier of a destination satellite corresponding to the NID, wherein the mapping relationship information is used to record a mapping relationship between the NID, an earth surface identifier (EID), and a space identifier (SID); and sending, by the first satellite, the data packet to the destination satellite.

2. The method according to claim 1, wherein a global network of the satellite communications system comprises a plurality of IP networks, each IP network is allocated with an NID, an earth surface is divided into a plurality of ground areas, each ground area is allocated with a ground area identifier (EID), each EID corresponds to one or more NIDs, each NID uniquely corresponds to one EID, space is divided into a plurality of space areas, each space area is allocated with a space identifier (SID), and each SID uniquely corresponds to one EID.

3. The method according to claim 2, wherein when the first satellite runs in a first space area identified by a first SID, a ground area covered by the first satellite is a first ground area identified by a first EID corresponding to the first SID, and the first satellite provides a service for a terminal device of a first NID corresponding to the first EID; and when the first satellite runs from the first space area to a second space area identified by a second SID, the ground area covered by the first satellite is changed to a second ground area identified by a second EID corresponding to the second SID, and the first satellite provides a service for a terminal device of a second NID corresponding to the second EID.

4. The method according to claim 2, wherein the IP address of the destination device is allocated when the destination device accesses the satellite communications system, the destination device is located in a third ground area when accessing the satellite communications system, and the NID comprised in the IP address corresponds to the third ground area.

5. The method according to claim 1, wherein determining the identifier of the destination satellite corresponding to the NID comprises:

determining, by the first satellite based on the NID and the mapping relationship information, an EID corresponding to the NID and an SID corresponding to the EID; and determining, by the first satellite, the identifier of the destination satellite based on the ephemeris and the SID.

6. The method according to claim 1, wherein the mapping relationship information is recorded in a first mapping relationship table, and an entry in the first mapping relationship table comprises the NID, the EID, and the SID; or the mapping relationship information is recorded in a second mapping relationship table and a third mapping relationship table, an entry in the second mapping relationship table comprises the NID and the EID, and an entry in the third mapping relationship table comprises the EID and the SID.

7. A data packet processing apparatus, comprising:
at least one processor; and at least one non-transitory computer-readable memory storing a program for execution by the at least one processor, the program comprising instructions for receiving a data packet, wherein the data packet carries an Internet Protocol (IP) address of a destination device, and the IP address comprises a network identifier (NID);

determining, based on the NID, mapping relationship information, and an ephemeris, an identifier of a destination satellite corresponding to the NID, wherein the mapping relationship information is used to record a mapping relationship between the NID, an earth surface identifier (EID), and a space identifier (SID); and outputting the data packet.

8. The apparatus according to claim 7, wherein a global network of the satellite communications system comprises a plurality of IP networks, each IP network is allocated with an NID, an earth surface is divided into a plurality of ground areas, each ground area is allocated with a ground area identifier (EID), each EID corresponds to one or more NIDs, each NID uniquely corresponds to one EID, space is divided into a plurality of space areas, each space area is allocated with a space identifier (SID), and each SID uniquely corresponds to one EID.

9. The apparatus according to claim 8, wherein the program further comprises instructions for:

when determining that the apparatus runs in a first space area identified by a first SID, recording a ground area covered by the apparatus as a first ground area identified by a first EID corresponding to the first SID, and provide a service for a terminal device of a first NID corresponding to the first EID; and when determining that the apparatus runs from the first space area to a second space area identified by a second SID, modifying the ground area covered by the apparatus to a second ground area identified by a second EID corresponding to the second SID, and provide a service for a terminal device of a second NID corresponding to the second EID.

10. The apparatus according to claim 8, wherein the IP address of the destination device is allocated when the destination device accesses the satellite communications system, the destination device is located in a third ground area when accessing the satellite communications system, and the NID comprised in the IP address corresponds to the third ground area.

11. The apparatus according to claim 7, wherein the program further comprises instructions for:

determining, based on the NID and the mapping relationship information, an EID corresponding to the NID and an SID corresponding to the EID; and determining the identifier of the destination satellite based on the ephemeris and the SID.

12. The apparatus according to claim 7, wherein the at least one non-transitory computer-readable memory is configured to store the mapping relationship information, wherein the mapping relationship information is recorded in a first mapping relationship table, and an entry in the first mapping relationship table comprises the NID, the EID, and the SID; or the mapping relationship information is recorded in a second mapping relationship table and a third mapping relationship table, an entry in the second mapping relationship table comprises the NID and the EID, and an entry in the third mapping relationship table comprises the EID and the SID.

13. The apparatus according to claim 7, wherein the apparatus is a chip.

14. A non-transitory computer-readable storage medium, wherein the non-transitory computer-readable storage medium stores a computer program, and when the computer program is run on a computer, the computer is enabled to:
receive a data packet carring an Internet Protocol (IP) address of a destination device, and the IP address comprises a network identifier (NID);
determine, based on the NID, mapping relationship information, and an ephemeris, an identifier of a destination satellite corresponding to the NID, wherein the mapping relationship information is used to record a mapping relationship between the NID, an earth surface identifier (EID), and a space identifier (SID); and
output the data packet.

15. The computer-readable storage medium according to claim 14, wherein a global network of the satellite communications system comprises a plurality of IP networks, each IP network is allocated with an NID, an earth surface is divided into a plurality of ground areas, each ground area is allocated with a ground area identifier (EID), each EID corresponds to one or more NIDs, each NID uniquely corresponds to one EID, space is divided into a plurality of space areas, each space area is allocated with a space identifier (SID), and each SID uniquely corresponds to one EID.

16. The computer-readable storage medium according to claim 15, wherein the computer is further enabled to:
when determining that the computer runs in a first space area identified by a first SID, record a ground area covered by the computer as a first ground area identified by a first EID corresponding to the first SID, and provide a service for a terminal device of a first NID corresponding to the first EID; and
when determining that the computer runs from the first space area to a second space area identified by a second SID, modify the ground area covered by the apparatus to a second ground area identified by a second EID corresponding to the second SID, and provide a service for a terminal device of a second NID corresponding to the second EID.

17. The computer-readable storage medium according to claim 15, wherein the IP address of the destination device is allocated when the destination device accesses the satellite communications system, the destination device is located in a third ground area when accessing the satellite communications system, and the NID comprised in the IP address corresponds to the third ground area.

18. The computer-readable storage medium according to claim 14, wherein the computer is further enabled to:
determine, based on the NID and the mapping relationship information, an EID corresponding to the NID and an SID corresponding to the EID; and
determine the identifier of the destination satellite based on the ephemeris and the SID.

19. The computer-readable storage medium according to claim 14, further configured to store the mapping relationship information, wherein
the mapping relationship information is recorded in a first mapping relationship table, and an entry in the first mapping relationship table comprises the NID, the EID, and the SID; or
the mapping relationship information is recorded in a second mapping relationship table and a third mapping relationship table, an entry in the second mapping relationship table comprises the NID and the EID, and an entry in the third mapping relationship table comprises the EID and the SID.

* * * * *

UNITED STATES PATENT AND TRADEMARK OFFICE
CERTIFICATE OF CORRECTION

PATENT NO. : 12,224,848 B2  
APPLICATION NO. : 17/502353  
DATED : February 11, 2025  
INVENTOR(S) : Meixin Lin et al.

Page 1 of 1

It is certified that error appears in the above-identified patent and that said Letters Patent is hereby corrected as shown below:

In the Claims

In Column 21, Claim 14, Line 7, delete "carring" and insert -- carrying --, therefor.

Signed and Sealed this  
Twenty-second Day of July, 2025

Coke Morgan Stewart  
*Acting Director of the United States Patent and Trademark Office*